United States Patent
Koase et al.

(10) Patent No.: US 7,056,245 B2
(45) Date of Patent: Jun. 6, 2006

(54) BELT DRIVING APPARATUS AND A LIQUID EJECTING APPARATUS

(75) Inventors: Takashi Koase, Nagano-ken (JP);
Eiichi Miyashita, Nagano-ken (JP);
Yasuhiko Yoshihisa, Nagano-ken (JP);
Masaaki Tsuda, Kanagawa-ken (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 10/635,163

(22) Filed: Aug. 5, 2003

(65) Prior Publication Data

US 2004/0097310 A1 May 20, 2004

(30) Foreign Application Priority Data

Aug. 6, 2002 (JP) ............................. 2002-229188
Jun. 30, 2003 (JP) ............................. 2003-189097

(51) Int. Cl.
*F16H 7/12* (2006.01)
(52) U.S. Cl. ........................................ 474/133; 474/148
(58) Field of Classification Search ................ 474/139, 474/121, 133, 134, 117, 135, 237, 166, 148
See application file for complete search history.

(56) References Cited

U.S. PATENT DOCUMENTS 5,991,575 A * 11/1999 Okiyama et al. ........... 399/165
6,485,207 B1 * 11/2002 Allen et al. ................. 400/335
6,628,909 B1 * 9/2003 Monahan et al. ........... 399/116

FOREIGN PATENT DOCUMENTS

| JP | 07-105592 | | 4/1995 |
| JP | 2001-63866 | | 3/2001 |
| JP | 2001063866 A | * | 3/2001 |
| JP | 2001-334715 | | 12/2001 |

OTHER PUBLICATIONS

Copy of Chinese Office (with partial English translation) dated Oct. 1, 2005.

* cited by examiner

*Primary Examiner*—Vicky A. Johnson
(74) *Attorney, Agent, or Firm*—John J. Penny, Jr.; Edwards Angell Palmer & Dodge LLP

(57) ABSTRACT

A belt driving apparatus has a motor for generating the driving force, a toothed driving pulley rotating by the driving force, an endless toothed belt wound on the pulley, wherein a first surface of the toothed belt has teeth corresponding to teeth of the pulley and a second surface of the toothed belt is substantially smooth, an auxiliary roller for holding the toothed belt in a gap defined by the pulley and the auxiliary roller, a roller holding unit for holding the pulley and the auxiliary roller to be able to respectively rotate on axes of the pulley and the auxiliary roller and maintaining the gap between the pulley and the auxiliary roller and an urging member for urging the roller holding unit in a direction to the toothed belt around the pulley in order for the auxiliary roller hold by the roller holding unit to provide a tension to the toothed belt.

6 Claims, 7 Drawing Sheets

BELT DRIVING APPARATUS AND A LIQUID EJECTING APPARATUS

This patent application claims priority from Japanese patent applications Nos. 2002-229188 filed on Aug. 6, 2002 and 2003-189097 filed on Jun. 30, 2003, the contents of which are incorporated herein by reference.

BACKGROUND OF THE INVENTION

1. Field of the Invention

The present invention relates to a belt driving apparatus and a liquid ejecting apparatus. More particularly, the present invention relates to a belt driving apparatus and a liquid ejecting apparatus, which drive an endless toothed belt.

2. Description of the Related Art

There has been conventionally known a recording apparatus as an example of a liquid ejecting apparatus for carrying a medium to be recorded by using a toothed belt. According to the recording apparatus of this type, the toothed belt is wound on a toothed driving pulley and a transfer roller. In case the driving pulley rotates in a forward direction, a driving force of the driving pulley is conveyed to the transfer roller by the toothed belt, and the transfer roller feeds the medium to be recorded.

In case the toothed belt is bent, the toothed belt may slip off from the driving pulley by weakening the engagement of the teeth of the driving pulley and the toothed belt. Therefore, by providing a tensioner to the recording apparatus for providing a tension to the toothed belt, bending of the toothed belt is prevented by this tensioner. As a tensioner for applying tension to the toothed belt, there is a tensioner for providing a tension to a carriage belt which drives a carriage as disclosed in a Japanese Patent Application Laid-Open No. 2001-334715 which is schematically shown in FIG. 2.

However, even in case the provided tensioner applies tension to the toothed belt, it is still possible for the toothed belt to slip off from the driving pulley. In this case, since the rotating amount of the toothed belt or the transfer roller is less than that of the driving pulley, the amount of displacement of the medium to be recorded is less than desired amount of displacement corresponding to the rotating amount of the toothed pulley.

SUMMARY OF THE INVENTION

Therefore, it is an object of the present invention to provide a belt driving apparatus and a liquid ejecting apparatus, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a belt driving apparatus comprises a toothed pulley, an endless toothed belt wound on the pulley, wherein a first surface of the toothed belt includes teeth corresponding to teeth of the pulley and a second surface of the toothed belt is substantially smooth, an auxiliary roller for holding the toothed belt in a gap defined by the pulley and the auxiliary roller, a roller holding unit for holding the pulley and the auxiliary roller to be able to respectively rotate on axes of the pulley and the auxiliary roller and maintaining the gap between the pulley and the auxiliary roller and an urging member for urging the roller holding unit in a direction to the toothed belt around the pulley in order for the auxiliary roller hold by the roller holding unit to provide a tension to the toothed belt. Owing to this, it is possible to feed the medium to be recorded by a desired transfer distance corresponding to the rotating amount of the toothed driving pulley by firmly engaging the each tooth of the toothed belt and the toothed driving pulley while applying the tension to the toothed belt.

The belt driving apparatus may further include a motor for providing a driving force, wherein the pulley is coupled to the motor and rotated due to the driving force. Owing to this, it is possible to firmly engage the toothed belt and the pulley though the large driving force is applied to the pulley.

The auxiliary roller may provide the tension to the toothed belt at an engagement end point where the pulley is disengaged from the toothed belt when the toothed belt is rotated in a forward direction. Owing to this, it is possible to firmly engage the toothed belt and the pulley by preventing the venting in case the toothed belt rotates in the forward direction.

The engagement end point may be a point where the pulley comes to engage with the toothed belt when the toothed belt is rotated in a reverse direction. Owing to this, it is possible to firmly engage the toothed belt and the pulley by preventing the venting in case the toothed belt rotates in the backward direction.

A distance between centers of axes of the pulley and the auxiliary roller may be shorter than a sum of a radius of the auxiliary roller, a radius of the pulley, which is determined to be a distance from the center of the axis to a top end of a tooth of the pulley, and a distance from the second surface to a top end of a tooth of the toothed belt. Owing to this, it is possible to firmly engage the teeth the toothed belt and the teeth of the pulley.

A radius of the axis of the auxiliary roller near the center of the axis in its axial direction may be larger than a radius of the axis of the auxiliary roller at its other part in its axial direction. Owing to this structure, it is possible for the auxiliary roller to firmly urge the toothed belt against the axial center.

The roller holding unit may hold the axes of the pulley and the auxiliary roller by inserting therein the axes, a first cut-in portion may be formed on the roller holding unit, the first cut-in portion being continued from a first side end, where the toothed belt is wound, to a first holding point where the axis of the pulley is hold, and a second cut-in portion may be formed on the roller holding unit, the first cut-in portion being continued from a second side end, which is opposite to the first side end from which the pulley is inserted, to a second holding point where the axis of the auxiliary roller is hold. Owing to this, it is possible to assemble the belt driving apparatus easily.

According to the second aspect of the present invention, a liquid ejecting apparatus for recording a medium to be recorded at a recording area, includes a motor for providing a driving force, a toothed driving pulley rotated by the driving force, an endless toothed belt wound on the driving pulley for conveying the driving force of the driving pulley, wherein a first surface of the toothed belt comprises teeth corresponding to teeth of the driving pulley and a second surface of the toothed belt is substantially smooth, a transfer gear, on which the toothed belt is wound, rotated by the driving force conveyed by the toothed belt, a transfer roller for transferring the medium to be recorded to the recording area, the transfer roller being rotated integrally with the transfer gear and an auxiliary roller for holding the toothed belt in a gap defined by the pulley and the auxiliary roller.

Owing to this structure, it is possible to transfer the medium to be recorded by a desired transfer distance corresponding to the rotating amount of the toothed driving pulley by firmly engaging the each tooth of the toothed belt and the toothed driving pulley.

The liquid ejecting apparatus may further include a roller holding unit for holding the driving pulley and the auxiliary roller to be able to respectively rotate on axes of the pulley and the auxiliary roller and maintaining the gap between the pulley and the auxiliary roller and an urging member for urging the roller holding unit in a direction to the toothed belt around the pulley in order for the auxiliary roller hold by the roller holding unit to provide a tension to the toothed belt.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
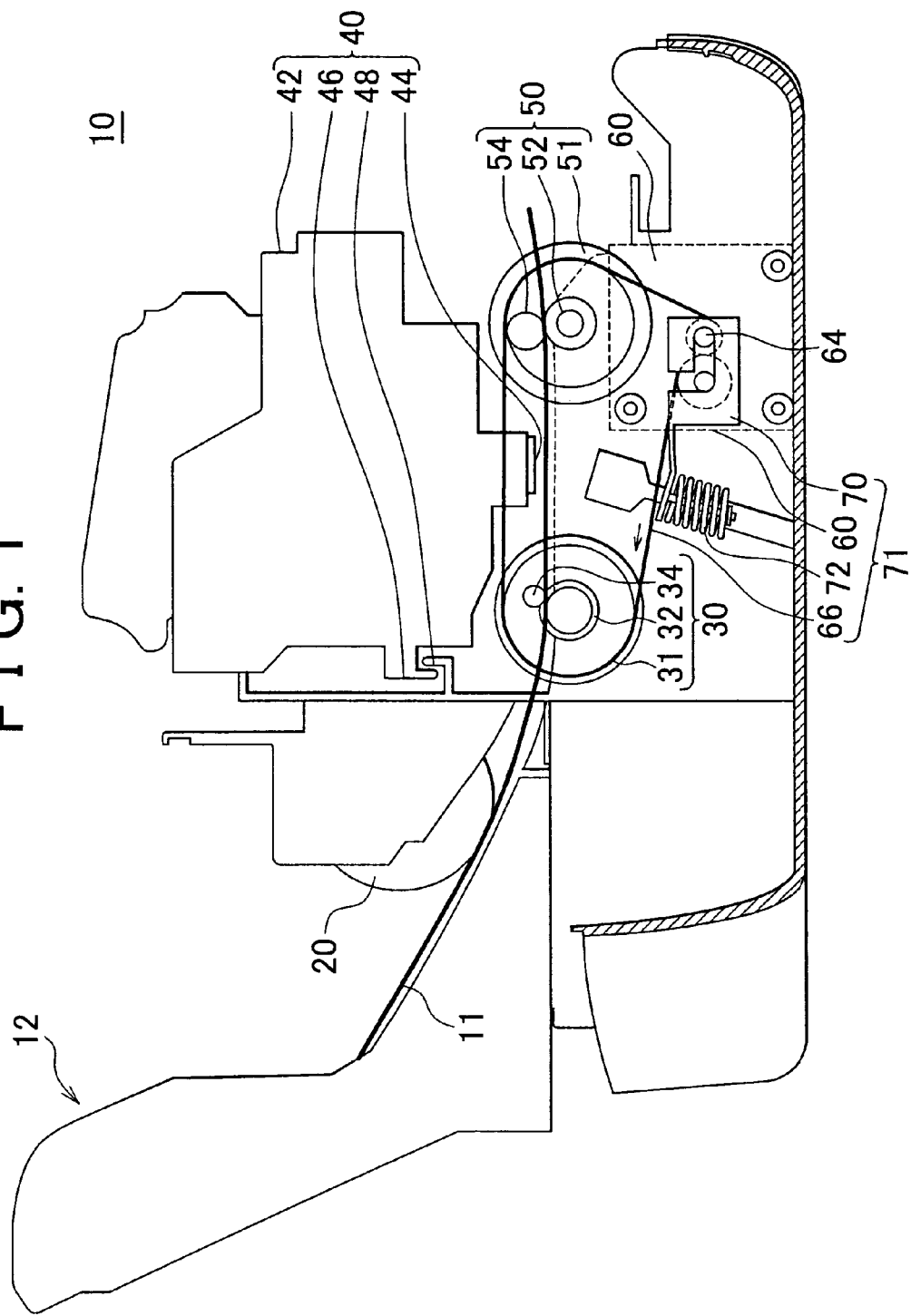
FIG. 1 shows an embodiment of internal structure of an ink-jet type recording apparatus 10 according to the present invention.

FIG. 1 shows a schematic side view of internal structure of an ink-jet type recording apparatus 10 according to an embodiment of the present invention. The ink-jet type recording apparatus 10 includes a mounting unit 12 for holding a plurality of medium to be recorded 11, a feeding unit 20 for feeding a medium to be recorded 11 by taking it out from the mounting unit 12 for recording, a transfer unit 30 for transferring the medium to be recorded 11 fed by the feeding unit 20 under a recording head 44 of a recording unit 40, which performs recording on the medium to be recorded 11, and a discharging unit 50 for discharging out the recorded medium 11 from under the recording head 44, in this order according to a feeding direction. The ink-jet type recording apparatus 10 further includes a belt driving apparatus 71 for providing driving forces to the transfer unit 30 and the discharging unit 50 in order to carry the medium to be recorded 11. The belt driving apparatus 71 includes a motor 60 for generating a driving force, a toothed driving pulley 64 for conveying the driving force of the motor 60 to an endless toothed belt 66, which is rotatively driven by the toothed pulley 64, a roller holding unit 70 described in detail later, and an urging member 72 for urging the roller holding unit 70.

The transfer unit 30 includes a toothed transfer gear 31 which is engaged with the toothed belt 66 and rotated by the motor 60, a transfer roller 32 which is coupled to and rotated integrally with the transfer gear 31, and a slave transfer roller 34 which is rotated with the transfer roller 32. The transfer roller 32 and the slave transfer roller 34 transfer the medium to be recorded 11 fed by the feeding unit 20 to a recording area under the recording head 44 by holding the recording medium 11 between them at a contacting point.

The recording unit 40 includes a carriage 42 on which an ink cartridge is mounted and a guiding groove 46 is formed on a sidewall thereof, a recording head 44, which is provided on a surface of the carriage 42 facing the medium to be recorded, for ejecting ink, and a guiding unit 48 for supporting the carriage 42 inserted on the guiding groove 46 to be horizontally movable in a direction perpendicular to the feeding direction of the medium to be recorded 11. Further, the recording head 44 includes a plurality of nozzles provided in a direction along with the feeding direction of the medium to be recorded 11.

The discharging unit 50 includes a toothed discharging gear 51, which is engaged with the toothed belt 66 and rotated by the motor 60, a discharging roller 52 coupled to and rotated integrally with the discharging gear 51 and a slave discharging roller 54 rotated with the discharging roller 52. The discharging roller 52 and the slave discharging roller 54 discharge the recorded medium 11 from the recording area by holding the medium 11 between them at a contacting point.

According to the above described structured the ink-jet type recording apparatus 10, the carriage 42 reciprocates along the guiding unit 48 and the nozzle of the recording head 44 provided on the carriage 42 jets ink. The ink-jet type recording apparatus 10 performs recording on the substantially whole recording area of the medium to be recorded 11 by feeding the medium 11 little by little whenever the recording head 44 completes one reciprocal cycle.

The medium to be recorded 11 is transferred by the toothed belt 66 conveying the rotation of the motor 60 to the transfer gear 31. In other words, when the toothed belt 66 rotates in a forward direction, or clockwise direction on FIG. 1 (hereinafter, "forward rotating direction"), the transfer gear 31 on which the toothed belt 66 is wound is rotated. According to the rotation of the transfer gear 31, the transfer roller 32 and the slave transfer roller 34 are rotated and the medium to be recorded 11 is transferred.

Figure 2:
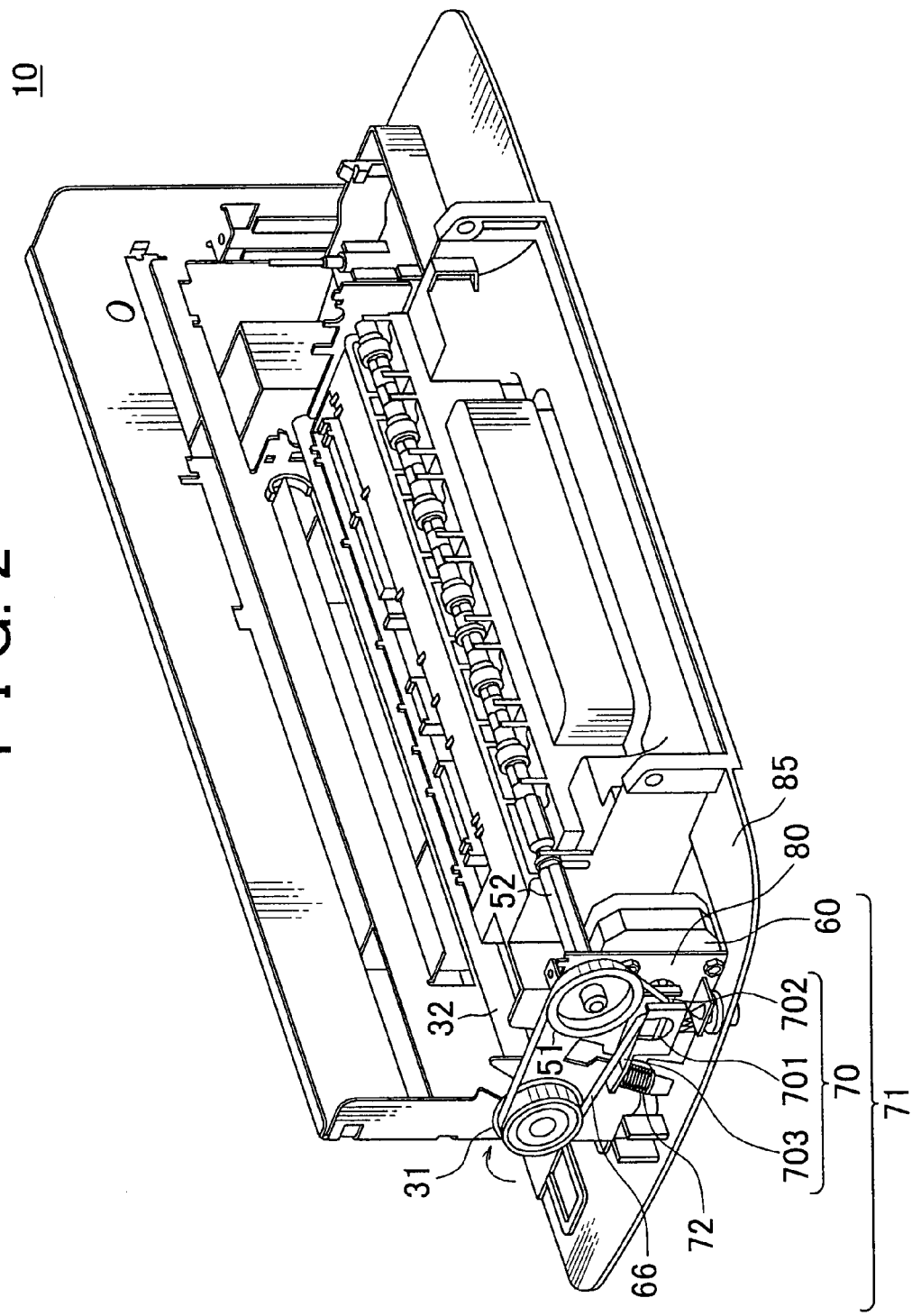
FIG. 2 shows a perspective view of important elements of the ink-jet type recording apparatus.
Figure 3:
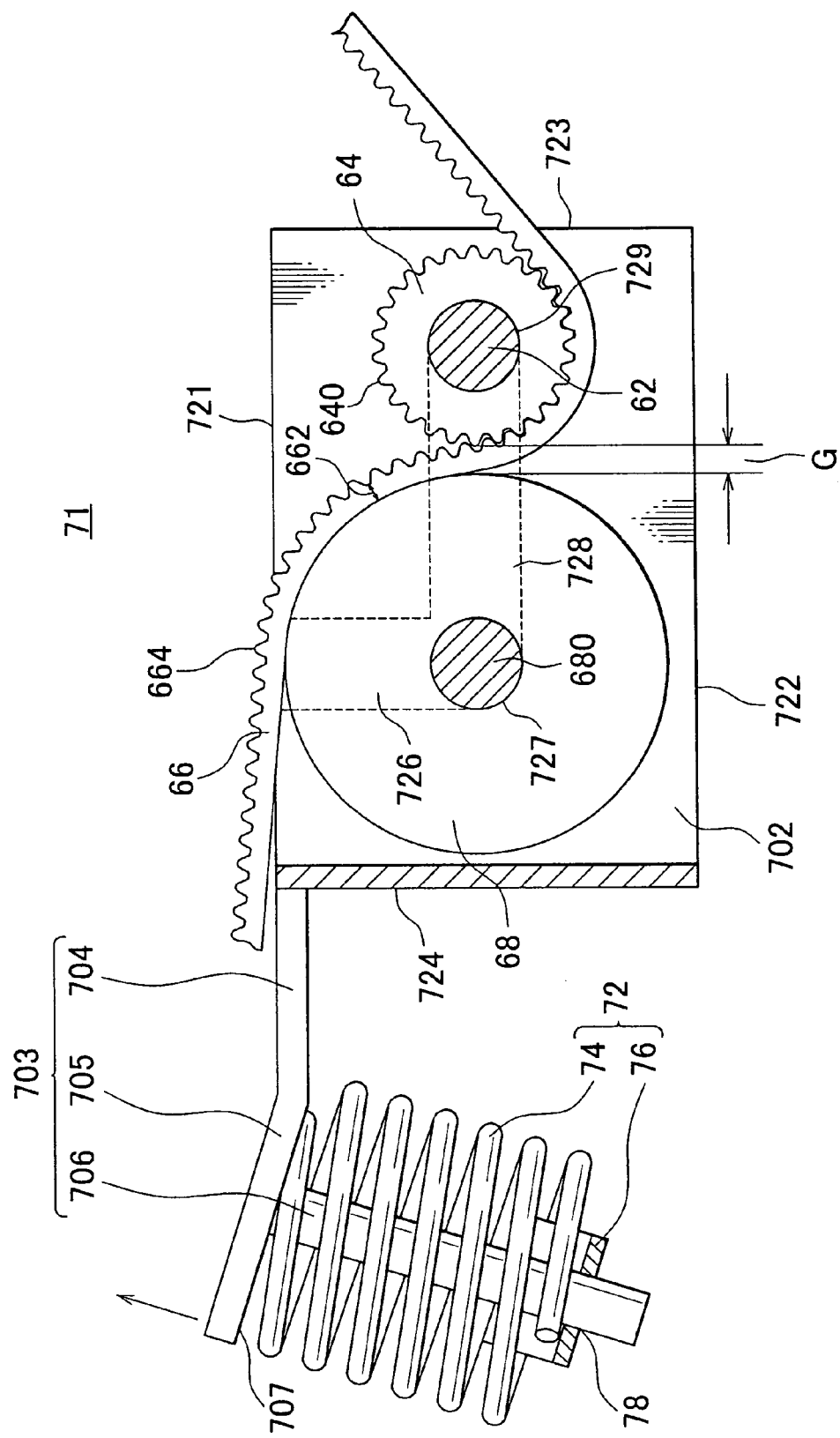
FIG. 3 shows a partial cross sectional view of a belt driving apparatus.

FIG. 2 shows a perspective view of important elements of the ink-jet type recording apparatus 10. FIG. 3 shows a partial cross sectional view of a belt driving apparatus 71. As shown in FIG. 2, the ink-jet type recording apparatus 10 includes a main frame 80 and a lower housing 85. The main frame 80 is fixed on the lower housing 85, and the urging member 72 and the motor 60 are held by a sidewall elongated vertically from the lower housing 85.

Further, as shown in FIG. 3, the belt driving apparatus 71 includes a motor 60, which includes a motor axis 71, a toothed driving pulley 64 coupled to the motor 60 by means of the motor axis 62, a toothed belt 66 wound on the toothed driving pulley 64, an auxiliary roller 68 provided near from the toothed driving pulley 64, a roller holding unit 70 for holding the auxiliary roller 68, and a urging member 72 for urging the roller holding unit 70. The toothed belt 66 is endless and includes teeth, which engage with teeth of the toothed driving pulley 64, on the inner surface thereof, and the outer surface of which is substantially smooth. Further, the toothed driving pulley 64 according to the present embodiment is only an example of the toothed pulley of the present invention.

The roller holding unit 70 rotatably holds the auxiliary roller 68 by taking the axis 680 of the auxiliary roller 68 as a center. Further, the roller holding unit 70 rotatably holds the auxiliary roller 68 by taking the toothed driving pulley 64 as an axis so that the auxiliary roller 68 can be displaced in a direction where the auxiliary roller 68 applies a tension to the toothed belt 66.

When the motor 60 rotatively drives the toothed belt 66, the toothed belt 66 is bent in a downstream direction of the toothed driving pulley 64 according to the forward rotating direction of the toothed belt 66. Because of this bending of the toothed belt 66, there may be problem that the toothed driving pulley 66 idles on the toothed belt 66, teeth of which do not engage with teeth of the toothed driving pulley 64. In order to solve this problem, it is devised to provide a tensioner for applying a tension to the toothed belt 66 on a downstream side of the toothed driving pulley 64 according to the forward rotating direction of the toothed belt 66.

However, in case the toothed belt 66 is rotated in a reverse direction (hereinafter, "reverse rotating direction"), the toothed belt 66 receives a reverse directional tension by the tensioner at some point between the tensioner and the toothed driving pulley 64. Therefore, the toothed belt 66 may slip off from the toothed driving pulley 64. In this case, the rotating amount of the toothed belt 66 or the transfer gear 31 becomes less than that of the driving pulley, and the amount of displacement of the medium to be recorded 11 becomes less than desired amount of displacement corresponding to the rotating amount of the toothed pulley 64.

According to the ink-jet type recording apparatus 10 of the present embodiment, it is an object to feed the medium to be recorded 11 by a desired amount of displacement corresponding to the rotating amount of the toothed driving pulley 64 by completely engaging teeth of the toothed belt 66 and the teeth of the toothed driving pulley 64.

Thus, the auxiliary roller 68 is provided according to the present embodiment. The auxiliary roller 68 holds the toothed belt 66 in a gap defined by the auxiliary roller and the toothed driving pulley 64, and rotates with the toothed belt 66. The auxiliary roller 68 includes a body of a substantial disc, and a rotation axis protruded from the center of the body to the side, and is formed of, for example, POM (poly-acetal) of sliding grade.

The roller holding unit 70 includes a pair of inner and outer holding plates 702 and 701, a side plate 724 for coupling the pair of inner and outer holding plates 702 and 701 and a handle unit 703. The roller holding unit 70 is preferably formed of standard or sliding grade POM. The inner holding plate 702 is arranged between the toothed driving pulley 64 and the main frame 80. The outer holding plate 701 faces the inner holding plate 702 by holding the toothed driving pulley 64 between them. The handle unit 703 has substantially the same width with that of a gap between the outer and inner holding plates 701 and 702, and couples upper ends of the outer and inner holding plates 701 and 702. The outer and inner holding plates 701 and 702 hold the toothed belt 66 between them, which passes between the auxiliary roller 68 and the toothed driving pulley, in-between from both sides according to the axial direction of the toothed driving pulley 64. Further, as for the description, FIG. 3 shows a structure of the above units without the outer holding plate 701 of the roller holding unit 70.

The inner holding plate 702 is substantially of a rectangle which has long and short sides. The outer and inner holding plates 701 and 702 hold the arc portions of the toothed belt 66, which are respectively contacted to the toothed driving pulley 64 and the auxiliary roller 68, between them from both sides of the toothed belt 66 according to the axial direction of the toothed driving pulley 64. Since the outer and inner holding plates 701 and 702 hold the toothed belt 66 between them from both sides of the belt 66 according to its width direction, the toothed belt 66 wound on the auxiliary roller 68 and the toothed driving pulley 64 is not possible to be shifted in the axial direction of the toothed driving pulley 64.

A first cutout portion 726 is formed on the inner holding unit 702 from a predetermined position of one long side 721 to the center of the two long sides 721 and 722 along the direction of the short side. Further, a second cutout portion 728 is formed on the inner holding unit 702 from an end of the first cutout portion 726 on about the center of the two long sides 721 and 722 to a predetermined position in front of a short side 723 along the direction of the long side. In the drawing, the first cutout portion 726 is formed downward from the long side 721, and the second cutout portion 728 is formed rightward from the bottom end of the first cutout portion 726. The structure of the outer holding plate 701 is the same with the inner holding plate 702, and detailed description on this is omitted.

Widths of the first and second cutout portions 726 and 728 are respectively determined to be substantially the same with diameters of the axes of the motor 62 and the auxiliary roller 68. An end 729 of the second cutout portion 728 is preferably formed to be an arc fit to the outer diameter of the axis of the motor 62. The axis of the motor 62 is rotatably contacted to the end 729. According to this, the roller holding unit 70 can rotate stably by taking the toothed driving pulley 64 as a center.

The round edge 727, where the first and second cutout portions 726 and 728 meet, is preferably formed to be an arc fit to the outer diameter of the axis of the auxiliary roller 68. The axis of the auxiliary roller 68 is rotatably contacted to the round edge 727. The arc of the round edge 727 is formed on the left bottom thereof in the drawing. As shown in the drawing, since the auxiliary roller 68 receives a tension in the left-downward direction from the toothed belt 66, the rotating axis 680 of the auxiliary roller 68 can be reliably contacted to the round edge 727 by received tension from the toothed belt 66.

The handle unit 703 includes a coupling unit 704 coupled to the outer and inner holding plates 701 and 702, a contacting unit 705 where the urging member 72 is contacted, and a position determining rod 706 elongated downwardly from the contacting unit 705. The contacting unit 705 has a contacting surface perpendicular to the urging direction of the urging member 72. According to this, the roller holding unit 70 can reliably receive the urging force from the urging member 72.

The urging member 72 includes a position controlling unit 76 where a hole 78 for movably holding the position determining rod 706 is formed. The position controlling unit 76 is fixed to the main frame 80. The inner diameter of the hole 78 is determined to be larger than the outer diameter of the position determining rod 706. The urging member 72 further includes a coil spring 74 provided between the position controlling unit 76 and the contacting surface 707.

Since the position of the position determining rod 706 is controlled by the hole 78, the coil spring 74 can be reliably contacted to the contacting surface 707. According to this, the urging member 72 urges the roller holding unit 70 in a direction (shown by an arrow in the drawing) where the auxiliary roller 68 applies a tension to the toothed belt 66 by taking the toothed driving pulley 64 as a center.

Width of the gap G between the auxiliary roller 68 and a tooth of the toothed driving pulley 64 is shorter than a sum of the thickness of the body 662 and the height of a tooth 664 of the toothed belt 66. According to this, since the toothed belt 66 is reliably contacted to the toothed driving belt 66, the teeth 664 of the toothed belt 66 can reliably engage with teeth 640 of the toothed driving pulley 64. The length of the second cutout portion 728 is shorter than a sum of the radii of the axis 680 of the auxiliary roller 68, the auxiliary roller 68, axis 62 of the motor, distance from the center of the toothed driving pulley 64 to the top end of the tooth 640, the thickness of the body 662 of the toothed belt 66, and the height of the tooth 664 of the toothed belt 66. According to this structure, width of the gap G between the auxiliary roller 68 and the tooth 640 of the toothed driving pulley 64 is shorter than a sum of the thickness of the body 662 and height of the tooth 664 of the toothed belt 66.

The auxiliary roller 68 is provided so that a contacting angle of the toothed belt 66 in regard to the toothed driving pulley 64, or a central angle of the arc where the toothed belt 66 is contacted to the toothed driving pulley 64, becomes as large as possible. According to this structure, teeth of the toothed belt 66 and the toothed driving belt 64 reliably engage with each other.

The auxiliary roller 68 provides a tension to the toothed belt 66 by being displaced by the urging member 72 in a direction where it rotates by taking the toothed pulley 64 as a rotation center. Thus, even in case the auxiliary roller 68 is displaced in order to provide the tension to the toothed belt 66, the gap G between the auxiliary roller 68 and the toothed belt 66 does not become larger so that the toothed belt 66 is reliably engaged with the toothed pulley 64.

A straight line which connects the contacting unit 705 and the toothed driving pulley 64 is substantially perpendicular to the direction where the urging member 72 provides the tension. According to this, a direction, where the roller holding unit 70 is rotated around the toothed driving pulley 64 as a center, is substantially the same with the direction where the urging member 72 urges the contacting unit 705.

Further, a distance from the toothed driving pulley 64 to the contacting unit 705 is longer than a distance from the toothed driving pulley 64 to the auxiliary roller 68. According to this, the urging member 72 can provide the tension to the toothed belt 66 by means of the auxiliary roller 68 with the small urging force by rotating the roller holding unit 70 around the toothed driving pulley 64 as the rotation center.

As described above, according to the present embodiment, the toothed belt 66 can engage with the toothed driving pulley 64 reliably by providing the auxiliary roller 68 which holds the toothed belt 66 between the toothed driving pulley 64 and the same. According to this structure, since the teeth of the toothed belt 66 and the toothed driving pulley 64 reliably engage with each other, it is possible to prevent the toothed driving pulley 64 from idling and to prevent the toothed belt 66 from slipping off. Therefore, it is possible to transfer the medium to be recorded 11 by a desired transfer distance corresponding to the rotating amount of the toothed driving pulley 64. The toothed belt 66 can be easily bent at a point in a downstream side in relation to the toothed driving pulley 64 according to the forward rotating direction. However, according to the present invention, since the auxiliary roller 68 provides the tension to the toothed belt 66 at a point in a downstream side in relation to the toothed driving pulley 64 according to the forward rotating direction of the toothed belt 66, it is possible to reliably prevent the toothed belt 66 from being bent. Further, the auxiliary roller 68 has a larger diameter than that of the toothed driving pulley 64. According to this, the arc, where the auxiliary roller 68 is contacted to the toothed belt 66, becomes larger so that it can provide the tension to the toothed belt 66 more reliably.

Further, since the roller holding unit 70 is urged by the urging member 72, the auxiliary roller 68 is displaced in a direction where it provides the tension to the toothed belt 66. According to this, the even in case the toothed belt 66 becomes loose with the passage of time, it is prevented for the toothed belt 66 to be bent and the teeth of the toothed belt 66 and the auxiliary roller 68 engage reliably with each other because the auxiliary roller 68 provides the tension to the toothed belt 66. In this case, since the auxiliary roller 68 urged by the urging member 72 provides the tension to the toothed belt 66, there is not needed to provide independent tensioner, and the required number of elements can be reduced. Further, according to the present embodiment, the pair of outer and inner holding plates 701 and 702 of the roller holding unit 70 hold the toothed belt 66, which is held in a gap between the auxiliary roller 68 and the toothed driving pulley 64, between them in the axial direction of the toothed driving pulley 64. Accordingly, the toothed belt 66 held between the auxiliary roller 68 and the toothed driving pulley 64 can be prevented from being slipped off from the toothed driving pulley 64 in its axial direction.

Further, the direction in which the first and second cutout portions 726 and 728 and the round edge 727 is formed to be the arc is not limited to that shown in FIG. 3. the round edge 727 may be formed to be an arc in the same direction as the tension the axis contacting the round edge 727 receives from the toothed belt 66. It is desirable that the first cutout portion 726 be formed in order that the component force along the first cutout potion 726 in regard to the tension the axis contacting the round edge 727 receives from the toothed belt 66 is directed from the long side 721 to the round edge 727. It is desirable that the second cutout portion 728 be formed in order that the component force along the second cutout potion 728 in regard to the tension the axis contacting the round edge 727 receives from the toothed belt 66 is directed from the end 729 to the round edge 727. Moreover, the roller holding unit 70 holding the toothed driving pulley 64 and the auxiliary roller 68 is not limited to the shape shown in FIG. 3.

Figure 4:
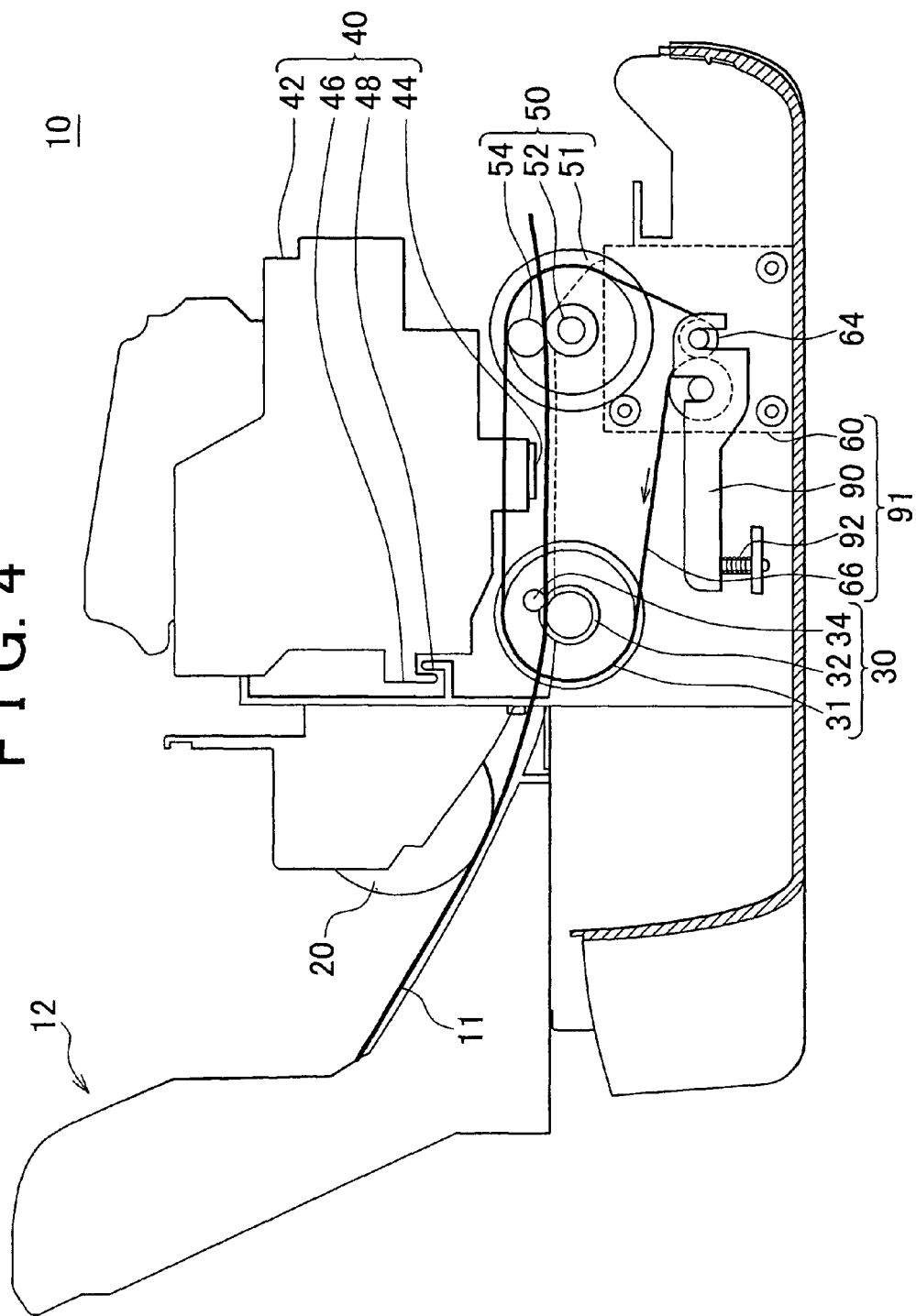
FIG. 4 shows a schematic side view of the ink-jet type recording apparatus which includes a belt driving apparatus having other roller holding unit.
Figure 5:
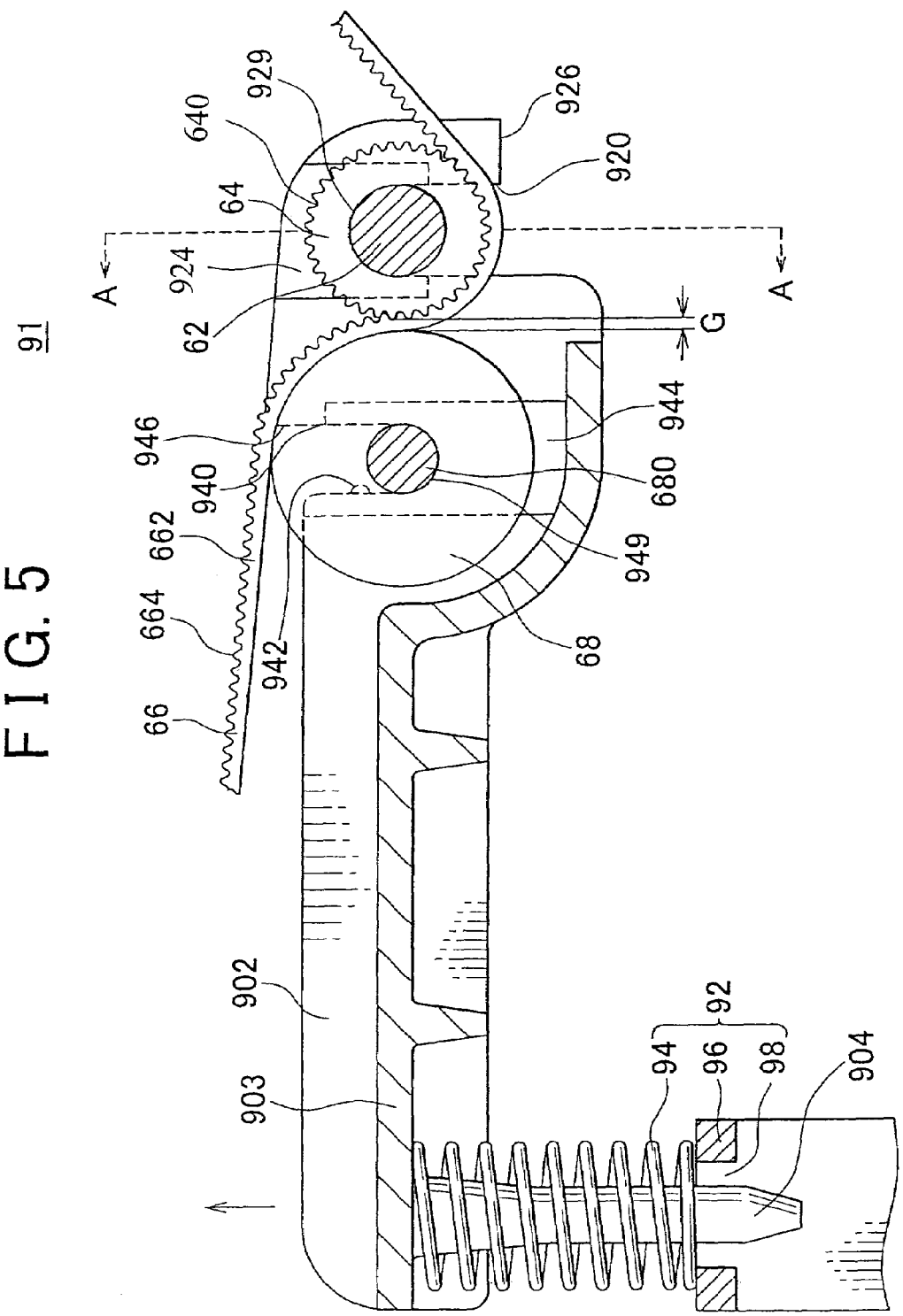
FIG. 5 shows a cross sectional view of a belt driving apparatus.
Figure 6:
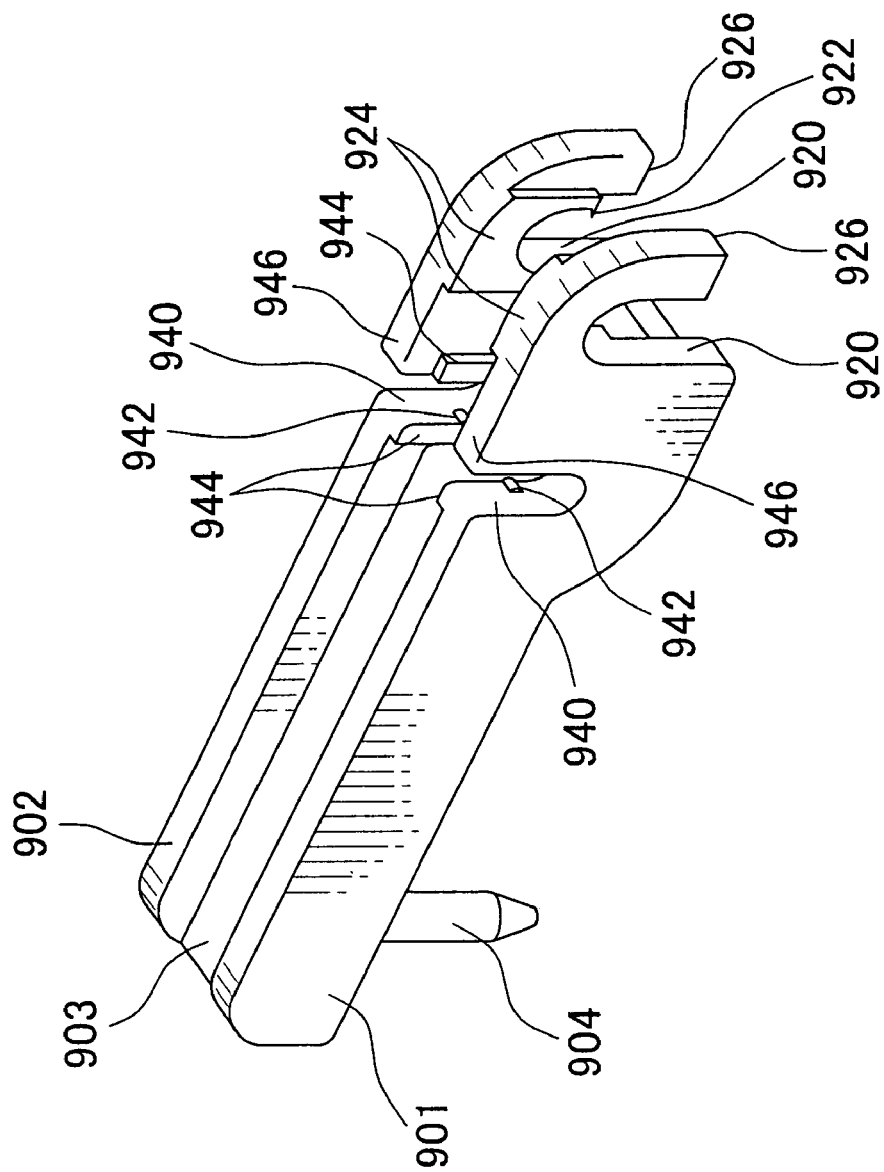
FIG. 6 shows a perspective view of the roller holding unit.

FIG. 4 shows a schematic side view of the ink-jet type recording apparatus 10 which includes a belt driving apparatus 91 having other roller holding unit 90. FIG. 5 shows a cross sectional view of the belt driving apparatus 91. FIG. 6 shows a perspective view of the roller holding unit 90. In regard to FIG. 4 and FIG. 5, the same components as those of FIG. 1 to FIG. 3 are given the same reference numbers and they will not be described.

As shown in FIG. 4, the belt driving apparatus 91 has the motor 60 generating the driving force, the toothed belt 66 rotating endlessly by the driving force of the motor 60, the roller holding unit 90 to be described below and the urging member 92 urging the roller holding unit 90.

As shown in FIG. 5, the roller holding unit 90 has the pair of outer and inner holding plates 901 and 902, which face each other in the longitudinal direction of the toothed belt 66, and the coupling unit 903 coupled to the outer and inner holding plates 901 and 902 downwardly. The roller holding unit 90 is formed of, for example, the standard or sliding grade POM. The outer and inner holding plates 901 and 902 hold the toothed driving pulley 64 and the auxiliary roller 68 and support them to allowing them to rotate. Moreover, as for the description, FIG. 5 shows the partial cross-sectional view of the above units without the outer holding plate 901 of the roller holding unit 90. Hereinafter, the description of the outer holding plate 901 will be omitted because the configuration of which is the same as that of the inner holding plate 902.

Like the embodiments shown in FIG. 1 to FIG. 3, the auxiliary roller 68 is arranged in a downstream direction of the toothed driving pulley 64 according to the forward rotating direction of the toothed belt 66 (the direction of the arrow in FIG. 4). The auxiliary roller 68 holds the toothed belt 66 in the gap defined by the auxiliary roller and the toothed driving pulley 64, and rotates with the toothed belt 66. The auxiliary roller 68 includes a body of a substantial disc, and a rotation axis protruded from the center of the body to the side, and is formed of, for example, POM of the sliding grade. By forming the auxiliary roller 68 using POM of the sliding grade the resistance due to the friction can be reduced when the auxiliary roller 68 rotates being supported by the roller holding 90.

In the inner holding plate 902 of the roller holding unit 90 both a cut-in portion for the driving pulley 920 in which the axis 62 for the toothed driving pulley 64 is inserted and a cut-in portion for the auxiliary roller 940 in which the axis 680 of the auxiliary roller 68 is inserted are formed. The cut-in portion for the driving pulley 920 is formed around an end of the longitudinal direction of the inner holding plate 902 to be continued from a side end 926 (downward direction in FIG. 5), where the toothed belt 66 is wound, to an end 929. The cut-in portion for the auxiliary roller 940 is more centrally formed to the longitudinal direction of the inner holding plate 902 than the cut-in portion for the driving pulley 920 to be continued from a side end 946 (upward direction in FIG. 5), which is opposite to the cut-in portion for the driving pulley 920 to an end 949. Since both of the cut-in portion for the driving pulley 920 and the cut-in portion for the auxiliary roller 940 are cut in from the side end 926 or 946, it becomes easy to insert the axis 62 coupled to the driving pulley 64 and the axis 680 of the auxiliary roller 68 into the cut-in portion for the driving pulley 920 and the cut-in portion for the auxiliary roller 940 respectively.

In addition, since the cut-in portion for the driving pulley 920 and the cut-in portion for the auxiliary roller 940 are cut in to the direction substantially perpendicular to the line linking the center axes of the toothed driving pulley 64 and the auxiliary roller 68 each other, the distance between the toothed driving pulley 64 and the auxiliary roller 68 can be mantained almost constantly, though the end 929 of the cut-in portion for the driving pulley 920 and the end 949 of the cut-in portion for the auxiliary roller 940 are worn away.

The distance between the cut-in portion for the driving pulley 920 and the cut-in portion for the auxiliary roller 940 is set in order that the width of the gap G between the auxiliary roller 68 and the end of the tooth 640 of the toothed driving pulley 64 is shorter than the sum of the thickness of the body 662 and the height of the tooth 664 of the toothed belt 66, in case the toothed driving pulley 64 and the auxiliary roller 68 are held. According to this setting, in case the axis 62 coupled to the driving pulley 64 and the axis 680 of the auxiliary roller 68 are inserted into the cut-in portion for the driving pulley 920 and the cut-in portion for the auxiliary roller 940 respectively, the distance between the center axis of the driving pulley 64 and the center axis of the auxiliary roller 68 is shorter than the sum of the radius of the auxiliary roller 68, the radius from the center of the axis 62 to the tooth end and the thickness from the back of the toothed belt 66 to the tooth end. Therefore, the teeth 664 of the toothed belt 66 and the teeth 640 of the toothed driving pulley 64 can be completely engaged each other.

The position determining rod 904 is provided in the roller holding unit 90 to extend downwardly from the end part opposite to the position at which the driving pulley 64 is held. The end of the position determining rod 904 is inserted into the hole 98 of the position controlling unit 96 provided in the main frame 80 of the ink-jet type recording apparatus 10. The coil spring 94 is provided between the position controlling unit 96 and the coupling unit 903, and the position determining rod 94 is inserted thereinto. The coil spring 94 is an example of the urging member 92. The coil spring 94 urges the coupling unit 903 upwardly (the arrow direction in FIG. 5). According to this, the coil spring 94 urges the roller holding unit 90 around the center axis of the toothed driving pulley 64 toward the toothed belt 66, and the auxiliary roller 68 held by the roller holding unit 90 gives the tension to the toothed belt 66.

As shown in FIG. 6, the fixing projection 922 is provided at the cut-in portion for the driving pulley 920 in the outer and inner holding plates 901 and 902 to project from the cut-in portion for the driving pulley 920. Owing to this structure, it can be prevented for the axis 62 and the driving pulley 64 coupled to the axis from separating from the cut-in portion for the driving pulley 920. In the same way, the fixing projection 942 is provided at the cut-in portion for the auxiliary roller 940 to project from the cut-in portion for the auxiliary roller 940. Owing to this, it can be prevented for the axis 680 from falling off from the cut-in portion for the auxiliary roller 940.

Moreover, the contacting unit 924 is provided around the cut-in portion for the driving pulley 920 in the outer and inner holding plates 901 and 902 to be thicker than the neighboring parts toward the inner direction. The toothed driving pulley 64 contacts the contacting unit 924 of the outer and inner holding plates 901 and 902, and it slides at the contacting unit 924 while rotating according to the rotation of the axis 62. Owing to this, it is possible to eliminate the looseness between the toothed driving pulley 64 and the roller holding unit 90. In the same way, the contacting unit 944 is provided around the cut-in portion for the auxiliary roller 940 to be thicker than the neighboring parts toward the inner direction. Owing to this, it is possible to eliminate the looseness between the auxiliary roller 940 and the roller holding unit 90.

Further, a smoothly curved surface is provided at the side end 926 in the outer and inner holding plates 901 and 902 to be placed at the corner in which the toothed belt 66 is wound by the toothed driving pulley 64 (downwardly in FIG. 6). In the same way, a smoothly curved surface is provided at the side end 946 to be placed at the corner in which the toothed belt 66 is wound by the auxiliary roller 68 (upwardly in FIG. 6). Owing to this, it can be prevented for the toothed belt 66 from wearing out caused by going in and out the outer and inner holding plates 901 and 902. Further, the outer and inner holding plates 901 and 902 are coupled to the coupling unit 903 through a smoothly curved surface. Owing to this, in case the toothed belt 66 deeply passes through between the outer and inner holding plates 901 and 902, it is possible to loose the toothed belt 66 from the outer and inner holding plates 901 and 902 by the curve.

Figure 7:
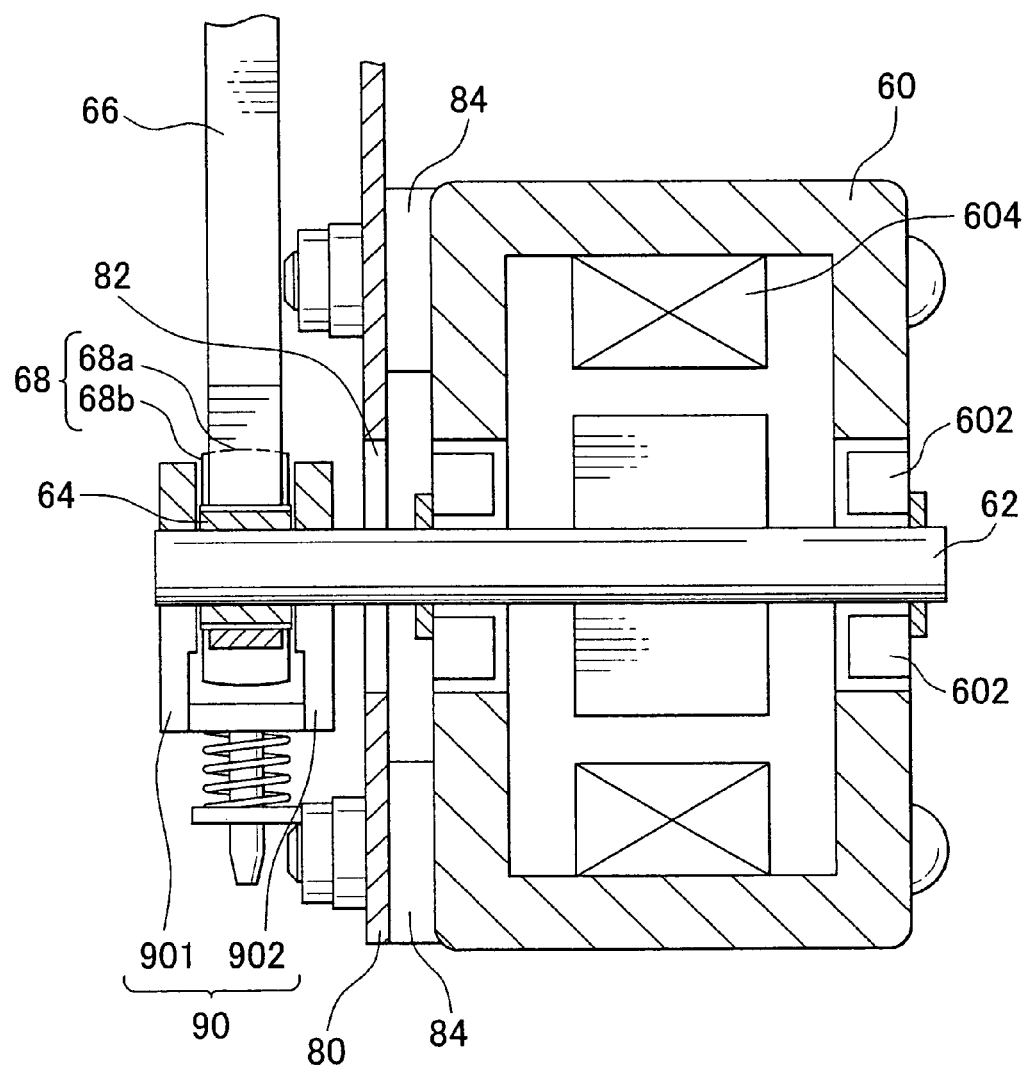
FIG. 7 shows a cross sectional view of the belt driving unit viewed in the direction of A—A of FIG. 5.

FIG. 7 shows a cross sectional view of the ink-jet type recording apparatus 10 viewed in the direction of A—A of FIG. 5. The motor 60 has the ball bearing 602 and the driving unit 604, and is installed in the main frame 80 through installation unit 84. The axis penetrates the penetration hole 82 formed in the main frame 80, and links the motor 60 and the toothed driving pulley 64. The driving unit 604 rotates the axis 62 in the forward or backward direction.

In case the toothed driving pulley 64 is directly coupled to the motor 60 through the axis 62, the large driving force is applied to the toothed driving pulley 64. In the present embodiment, there is little concern that the toothed belt 64 might slip out of the toothed driving pulley 64, even though the driving force of the toothed driving pulley 64 is large, because the auxiliary roller 68 holds the toothed belt 66 in a gap defined by the toothed driving pulley 64 and the auxiliary roller.

The diameter of the axial center 68a for the auxiliary roller 68 is larger than those of other parts(e.g., the axial end 68b). Owing to this, the toothed belt 66 is securely positioned around the axial center 68a of the auxiliary roller 68 when rotating, and it can be prevented from separating from the auxiliary roller 68 in regard to the axial direction.

Moreover, the axial widths of the toothed driving pulley 64 and the auxiliary roller 68 and the distance between the outer and inner holding plates 901 and 902 are larger than that of the toothed belt 66. Therefore, the toothed belt 66 rotates to pass along the axial centers of the toothed driving pulley 64 and the auxiliary roller 68, and it can be prevented from wearing out caused by the friction against the side surfaces of the outer and inner holding plates 901 and 902.

Here, if the axis 62 is not positioned at the center of the ball bearing 602 of the motor 60, it causes the loud noise due to the vibration. The tension of the toothed belt 66 is applied to the axis 62 upwardly. In the present embodiment, since the urging member 92 presses the auxiliary roller from the bottom part of the tooth belt 66, the auxiliary roller 68 receives the opposite force applied downwardly against the toothed belt 66. For this reason, the downward force is applied to the roller holding unit 90 as well. Hence, the roller holding unit 90 applies the force to the axis 62 from the upward direction, and it reduces the tension of the toothed belt 66 applied to the axis 62. Therefore, the axis 62 becomes positioned at the center against the motor 60, and the noise is reduced.

The method of assembling and inserting the auxiliary roller 68 and the roller holding unit 90 holding the auxiliary roller 68 into the ink-jet type recording apparatus 10 will now be described. The toothed driving pulley 64 is coupled to the axis 62. The toothed belt 66 is wound with the toothed driving pulley 64. The coil spring 94 is positioned between the roller holding unit 90 and the position controlling unit 96, and the position determining rod 904 of the roller holding unit 90 is inserted into the hole 98 of the position controlling unit 96. The axis 62 is inserted into the cut-in portion for the driving pulley 920 of the roller holding unit 90 while the toothed belt 68 is wound with the toothed driving pulley 64. Then, the axis 680 of the auxiliary roller 68 is inserted into the cut-in portion for the auxiliary roller 940 in order that the auxiliary roller 68 is positioned more downwardly than the toothed driving pulley 64 against the forward rotation of the toothed belt 66 to hold the toothed belt 66 between the toothed driving pulley 64 and itself. In this situation, the toothed belt 66 is wound in the sequence of the toothed driving pulley 64, the transfer gear 31 and the discharging gear 51. Owing to this, the auxiliary roller 68 holds the toothed belt 66 between the toothed driving pulley 64 and itself, while the toothed belt 66 is wound in the sequence of the toothed driving pulley 64, the transfer gear 31 and the discharging gear 51. Therefore, the auxiliary roller 68 and the roller holding unit 90 holding the auxiliary roller 68 can be assembled and inserted into the ink-jet type recording apparatus 10 by way of the simple method above.

When the roller holding unit 90 is assembled and inserted into the ink-jet type recording apparatus 10 by way of the method above, the toothed driving pulley 64 is supported from the bottom part by the toothed belt 66 and receives the upward tension from the toothed belt 66. Accordingly, the upper part of the axis 62 coupled to the toothed driving pulley 64 contacts the end 929 of the cut-in portion for the driving pulley 920 in the roller holding unit 90. And, the lower part of the axis 680 of the auxiliary roller 68 contacts the end 949 of the cut-in portion for the auxiliary roller 940 in the roller holding unit 90, and it is supported by the end 949. Here, since the coil spring 94 urges the coupling unit 903 in the upward direction, the roller holding unit 90 rotates upwardly around the axis 62. Owing to this, the auxiliary roller 68 held in the roller holding unit 90 urges the toothed belt 66, and it applies the tension to the toothed belt 66. Therefore, the toothed belt 66 is prevented from venting and slipping out of the toothed driving pulley 64 when rotating in the forward direction. Moreover, since the distance between the center axes of the toothed driving pulley 64 and the auxiliary roller 68 is shorter than the sum of the radius of the auxiliary roller 68, the radius from the center of the axis 62 to the tooth end and the thickness from the back of the toothed belt 66 to the tooth end, the teeth 664 of the toothed belt 66 and the teeth 640 of the toothed driving pulley 64 can be completely engaged each other, even though the tension is applied to the toothed belt 66 when the toothed belt 66 rotates in the backward direction.

As apparent from the description above, according to the present embodiment, it is possible to carry the medium to be recorded 11 by a desired transfer distance corresponding to the rotating amount of the toothed driving pulley 64 by firmly engaging the each tooth of the toothed belt 66 and the toothed driving pulley 64.

The ink-jet type recording apparatus 10 in the embodiments above is an example of the liquid ejecting apparatus. However, the present invention is not limited to this example. Another example of the liquid ejecting apparatus is the color filter manufacturing apparatus for manufacturing color filters of the liquid crystal display. In this case, the color material ejection head of the color filter manufacturing apparatus is an example of the liquid ejection head. Further another example of the liquid ejecting apparatus is the electrode forming apparatus for forming electrodes such as the organic EL display, FED (Field Emission Display). In this case, the electrode material(conduction paste) ejection head of the liquid ejecting apparatus is an example of the liquid ejection head.

Further another example of the liquid ejecting apparatus is the bio chip manufacturing apparatus for manufacturing bio chips. In this case, the living organism ejection head of the bio chip manufacturing apparatus and the sample ejection head as the minute pipette are examples of the liquid ejecting apparatus. The liquid ejecting apparatus of the present invention includes other liquid ejecting apparatuses for the industrial purpose. Moreover, the medium to be recorded is a thing on which something is recorded or printed by way of jutting liquid, such as, recordable papers, electronic circuits on which circuit patterns, for example, the electrodes of the display are printed, CD-ROM on which labels are printed and preparat on which DNA circuits are printed.

Although the present invention has been described by way of exemplary embodiments, it should be understood that those skilled in the art might make many changes and substitutions without departing from the spirit and the scope of the present invention which is defined only by the appended claims.

What is claimed is:

1. A belt driving apparatus comprising:
   a toothed pulley;
   an endless toothed belt wound on said pulley, wherein a first surface of said toothed belt comprises teeth corresponding to teeth of said pulley and a second surface of said toothed belt is substantially smooth;
   an auxiliary roller for holding said toothed belt in a gap defined by said pulley and said auxiliary roller;
   a roller holding unit for holding said pulley and said auxiliary roller to be able to respectively rotate on axes of said pulley and said auxiliary roller and maintaining said gap between said pulley and said auxiliary roller; and
   an urging member for urging said roller holding unit in a direction to said toothed belt around said pulley in order for said auxiliary roller held by said roller holding unit to provide a tension to said toothed belt, wherein a distance between centers of axes of said pulley and said auxiliary roller is shorter than a sum of a radius of said auxiliary roller, a radius of said pulley, which is determined to be a distance from the center of said axis to a top end of a tooth of said pulley, and a distance from said second surface to a top end of a tooth of said toothed belt.

2. A belt driving apparatus as claimed in claim 1, further comprising a motor for providing a driving force, wherein said pulley is coupled to said motor and rotated due to said driving force.

3. A belt driving apparatus as claimed in claim 1, wherein said auxiliary roller provides said tension to said toothed belt at an engagement end point where said pulley is disengaged from said toothed belt when said toothed belt is rotated in a forward direction.

4. A belt driving apparatus as claimed in claim 3, wherein said engagement end point is a point where said pulley becomes engaged with said toothed belt when said toothed belt is rotated in a reverse direction.

5. A belt driving apparatus as claimed in claim 1, wherein a radius of said axis of said auxiliary roller near the center of said axis in its axial direction is larger than a radius of said axis of said auxiliary roller at its other part in its axial direction.

6. A belt driving apparatus as claimed in claim 1, wherein
   said roller holding unit holds said axes of said pulley and said auxiliary roller by inserting therein said axes,
   a first cut-in portion is formed on said roller holding unit, said first cut-in portion being continued from a first side end, where said toothed belt is wound, to a first holding point where said axis of said pulley is held, and
   a second cut-in portion is formed on said roller holding unit, said first cut-in portion being continued from a second side end, which is opposite to said first side end from which said pulley is inserted, to a second holding point where said axis of said auxiliary roller is held.

* * * * *